March 1, 1960 A. A. TACCHELLA ET AL 2,926,641
UNIFORM TEMPERATURE, DUAL CIRCUIT ENGINE COOLING SYSTEM
Filed Jan. 20, 1958
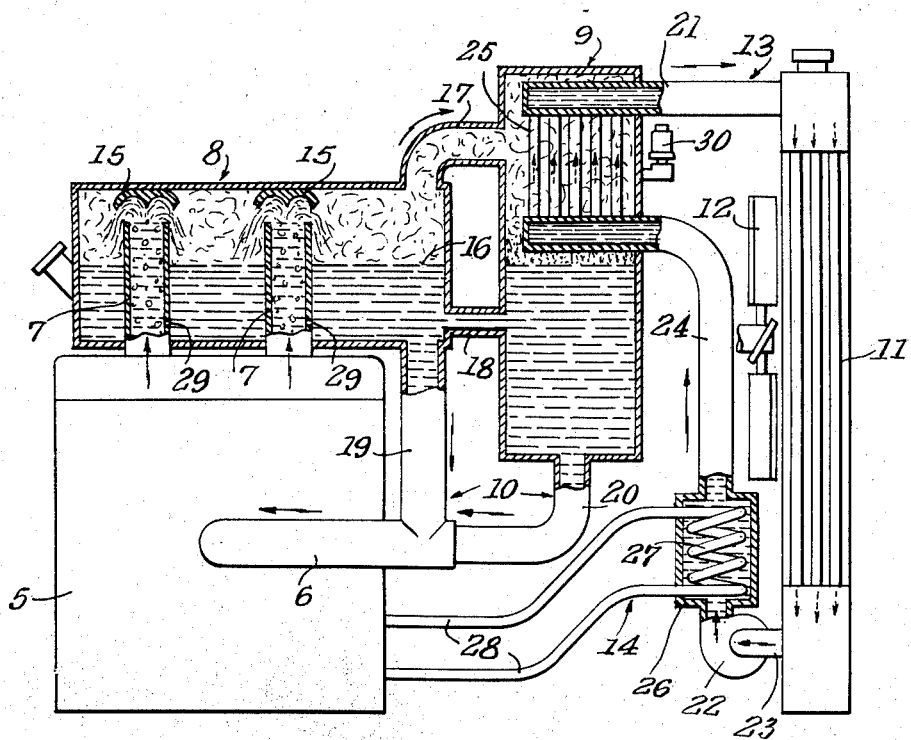
INVENTORS
ADOLPH A. TACCHELLA
ARNOLD N. ANDERSON
BY
C. G. Stratton
ATTORNEY

2,926,641

UNIFORM TEMPERATURE, DUAL CIRCUIT ENGINE COOLING SYSTEM

Adolph A. Tacchella, Altadena, and Arnold N. Anderson, Los Angeles, Calif., assignors to Tacchella, Inc., Los Angeles, Calif., a corporation of California Application January 20, 1958, Serial No. 709,892

6 Claims. (Cl. 123—41.21)

This invention relates to a cooling system for internal combustion engines that operates at a substantially even temperature and embodies a dual circulating circuit.

Reference is made to our Patent No. 2,804,860 issued September 3, 1957 in which a system is shown that cools an engine largely by ebullition, the same offering the advantage of a substantially constant cooling temperature regardless of engine load, after the boiling point of the coolant has been reached. The system disclosed in said patent also provides for a relatively small differential between the temperatures of the coolant entering and leaving the engine, the same resulting from the fact that most of the heat rejected to the coolant is used in the formation of steam (latent heat) and only part is used as sensible heat in raising the temperature of the coolant in its flow through the engine. Since, under the above conditions, it is not practical to use a circulating pump because the same would readily become steam-bound and thus interfere rather than assist in circulation of the coolant, it is, nevertheless, important that circulation of the coolant through the engine be maintained in an efficient and beneficial manner.

In an engine-cooling arrangement of the nature defined in said patent, circulation of the coolant through the engine is caused by the difference in the weight of the water column through the engine and the weight of the external return column. Of course, this is similar to thermal-siphon circulation. However, in this case, there is a greater difference in weight of the two columns because of the steam bubbles generated in the coolant during its passage through the engine, while the external return column consists of substantially solid or non-aerated water. Since the coolant passages through the engine are more complicated than the passage in the internal-external circuit, there is a much higher friction loss through the engine than through the external return passage. In order to minimize these friction losses, it is an object of the present invention to provide novel and improved means facilitating the discharge of coolant under ebullition from the engine being cooled largely by ebullition.

Another object of the invention is to provide improved and separate discharge of coolant from around each cylinder of an internal combustion engine to improve the circulation, by ebullition, of said coolant.

A further object of the invention is to provide the usual water header of an internal combustion engine with steam-separating means, so that such individual discharge of coolant from around the individual cylinders of an engine is subject to minimum friction and/or resistance and, thereby, facilitates flow thereof outward of the engine. This largely minimizes back pressure and, by providing the coolant level at a point below the outlet of the ebullition flow, the system is relieved of inordinately high back pressure.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

The figure is a semi-diagrammatic view of a preferred form of cooling system according to the present invention, and shown in semi-conventional relationship to an internal combustion engine.

The uniform temperature, dual circuit engine cooling system of the present invention comprises, generally, in combination with an engine 5 having a coolant inlet 6 common to all the cylinders of the engine, individual outlets 7 for the coolant of each of the cylinders of said engine and discharging upwardly therefrom, a primary steam-separating chest 8 into which the outlets 7 are directed and into which they discharge, a condenser chest 9 connected to the chest 8 and receptive of both the coolant and the steam occupying the primary chest, a common return 10 from both the chests to the inlet 6, a conventional radiator 11 cooled by air circulation due to mobility of the present installation and/or by a fan 12, a closed cooling circuit 13 including the radiator 11 to cool steam in the chest 9 and condense the same, and an oil-cooling means 14 interconnected with the circuit 13 for cooling the lubricant of the engine 5 or for other purposes.

The drawing shows but two separate or individual coolant outlets 7. However, one such outlet may be provided for each cylinder of the engine.

In any case, the outlets are directed upwardly and open in an upward direction.

The primary separator chest 8 is preferably located immediately above the engine, substantially in the manner shown, the same occupying space ordinarily available above an internal combustion engine. The interior of the chest 8 immediately above each of the outlets 7 is provided with a deflector 15 that receives the discharge from said outlet tubes and directs the same angularly laterally into the interior of the chest above the coolant level 16 thereof. Thus, it will be seen that the discharge of said outlets is in an atmosphere that is considerably lower in pressure than the liquid below the level 16.

The condenser chest 9 is preferably located alongside of the chest 8 and is connected, near its upper end, to the latter chest by a conduit 17 and below the level of coolant 16, by a conduit 18. In this manner, the two chests are substantial continuations of each other, with the exception that the condenser chest 9 is extended to be somewhat higher than the upper end of the primary chest 8 so as to receive steam flow from the latter chest.

The return 10 comprises a downwardly directed conduit 19 from the lower part of the chest 8 and a similarly directed conduit 20 from the lower part of the chest 9. These latter conduits, 19 and 20, join the common inlet 6 and return liquid coolant from the two chests to the engine 5.

The circuit 13 comprises a conduit 21 extending from the upper portion of the radiator 11 and into the steam area in the upper part of the condenser chest 9, a pump 22 connected by a conduit 23 to the lower part of the said radiator and drawing fluid from said radiator, a conduit 24 extending from the outlet of said pump 22 and terminating in the mentioned upper portion of the condenser chest 9 and below the conduit 20, and a condenser 25 interconnecting the conduit 21 to provide a flow of heat exchange fluid that affects the steam in said condenser chest and condenses the same, as can be well understood.

The oil-cooling means 14 is here shown as an enlarged housing 26 in the conduit 24, a condenser coil 27 disposed in said housing, and a pair of tubes 28 extending from the opposite ends of said coil 27 and entering the engine 5 to connect with the lubrication-circulating system of said engine. It will be realized that the tubes 28 may be connected to another device than the engine 5 and that the means 14 is optional in the present system.

Each of the outlet tubes 7 is provided with an aperture 29 nearer its lower end and on the inside of the chest 8. The purpose for said apertures will be hereinafter explained. Optionally, a thermostatically controlled air vent 30 may be provided in the steam-containing portion of the auxiliary chest 9 or the chest 8, to provide for the automatic discharge of air and other non-condensable gases which may accumulate in either of said tanks and cause a block to access of steam to the condenser 25. Said vent is preferably provided in the chest 9 rather than in chest 8 because the same may be placed in a position elevated above the upper part of the chest 8.

When the engine is started up, the circulation of the coolant therein is by thermosiphon. Therefore, the coolant will rise in the engine and in the outlet tubes 7. Before the engine warms up, the circulation of the coolant is from said tubes 7 through apertures 29 into the bottom of the primary chest 8, down through conduit 19 and thence into inlet 6 to the engine 5.

As the temperature of the coolant rises, the liquid level in said outlet tubes 7 rises and, as the boiling temperature is approached, the coolant carries upwardly a multiplicity of bubbles which are discharged in the form of a water vapor from the upper end of said tubes and into impingement with the deflectors 15. Such of the liquid that condenses will be added to the level of liquid 16 and circulate back to the engine, as before. The drier steam will pass upward through the conduit 17 into the upper portion of the chest 9 and into heat exchange engagement with the condenser 25. The latter, thus, will condense such steam and the same will precipitate into the lower portion of said chest 9.

The conduit 18 that connects the tanks may be omitted if the coolant used is water only. However, if an anti-freeze-water mixture is used as a coolant, the conduit 19 may be omitted or the conduits 18, 19 and 20 so dimensioned and proportioned as to insure that such coolant mixture that enters the condenser chest 9 is of such degree as to prevent damage that may result from freezing. The foregoing is mentioned since it must be considered that the condensate from a coolant that contains an anti-freeze component would be largely water.

It will be noted that only condensate is circulated back to the engine and that the same is formed as a condensed component of the ebullient discharge of the individual outlet tubes 7. The operation and circulation of the circuits 13 and 14 need not be described in detail, since the same do not form a material part of the present invention, but are shown primarily to present an integrated system for engine 5. The mentioned patent, in greater detail, describes circuits comparable to circuits 13 and 14.

While the foregoing specification illustrates and describes what we now contemplate to be the best mode of carrying out our invention, the construction is, of course, subject to modification without departing from the spirit and scope of our invention. Therefore, we do not desire to restrict the invention to the particular form of construction illustrated and described, but desire to cover all modifications that may fall within the scope of the appended claims.

Having thus described our invention, what we claim and desire to secure by Letters Patent is:

1. The combination with an engine having plural cylinders and a single inlet for coolant to circulate around said cylinders, of a separate coolant outlet for each cylinder and opening upwardly, a steam separator chest above the engine and into the upper portion of which said separate outlets discharge the steam component of the coolant, said chest collecting the condensate of the outlet discharges, a conduit to conduct such condensate to the coolant inlet, a condenser chest, respective conduits connecting the upper and lower portions of the chests, a conduit to conduct coolant in the condenser chest to the coolant inlet, and means partly disposed in the upper steam portion of the condenser chest to condense steam therein.

2. The combination according to claim 1, and a deflector in the first-mentioned chest above each coolant outlet to deflect coolant downwardly laterally into the lower portion of said tank.

3. In an internal combustion engine cooling system in which the engine is provided with a plurality of cylinders, a separate coolant outlet from each said cylinder, a steam-separating chest above the engine and into which said coolant outlets discharge, and means to condense such discharge and direct the same back to the engine to cool the cylinders thereof.

4. In a system according to claim 3, a condenser chest connected to the first-mentioned chest to receive steam therefrom, the condensing means being provided in the condenser chest.

5. In a system according to claim 3, a condenser chest connected to the first-mentioned chest to receive steam therefrom, the condensing means being provided in the condenser chest, and a common conduit connection from the condensate-holding portions of the two chests to the engine.

6. The combination with an engine having plural cylinders and a single inlet for coolant to circulate around said cylinders, of a separate coolant outlet for each cylinder and opening upwardly, a steam separator chest above the engine and into the upper portion of which said separate outlets discharge the steam component of the coolant, said chest collecting the condensate of the outlet discharges, a conduit to conduct such condensate to the coolant inlet, a condenser chest, a conduit connecting the upper portions of the chests, a conduit to conduct coolant in the condenser chest to the coolant inlet, means partly disposed in the upper steam portion of the condenser chest to condense steam therein, and a deflector in the first-mentioned chest above each coolant outlet to deflect coolant downwardly laterally into the lower portion of said tank.

References Cited in the file of this patent

UNITED STATES PATENTS

| | | |
|---|---|---|
| 1,630,068 | Muir | May 24, 1927 |
| 2,443,518 | Rushore | June 15, 1948 |
| 2,787,986 | Keller et al. | Apr. 9, 1957 |